United States Patent
Fredrick, Jr.

(10) Patent No.: US 7,363,796 B2
(45) Date of Patent: Apr. 29, 2008

(54) COLD FORM NOZZLE FOR LASER PROCESSING

(75) Inventor: William G. Fredrick, Jr., Northville, MI (US)

(73) Assignee: Laser Mechanisms, Inc., Farmington, MI (US)

( * ) Notice: Subject to any disclaimer, the term of this patent is extended or adjusted under 35 U.S.C. 154(b) by 121 days.

(21) Appl. No.: 10/999,296

(22) Filed: Nov. 29, 2004

(65) Prior Publication Data

US 2005/0126250 A1 Jun. 16, 2005

Related U.S. Application Data

(60) Provisional application No. 60/526,119, filed on Dec. 1, 2003.

(51) Int. Cl.
*B21K 1/20* (2006.01)
*B23P 13/00* (2006.01)

(52) U.S. Cl. .................. 72/358; 72/370.01; 29/890; 29/890.02; 76/107.6; 219/121.25; 372/701

(58) Field of Classification Search ............... 72/358, 72/370.01; 29/890.02, 890.142, 890; 76/107.6; 219/121.6, 121; 372/701
See application file for complete search history.

(56) References Cited

U.S. PATENT DOCUMENTS

| | | | | | |
|---|---|---|---|---|---|
| 2,217,194 | A | * | 10/1940 | Bryce et al. | 29/890.02 |
| 3,579,807 | A | * | 5/1971 | Matulewicz | 228/170 |
| 4,461,162 | A | * | 7/1984 | Ibach | 72/344 |
| 5,192,847 | A | * | 3/1993 | Jagiella et al. | 219/121.6 |
| 5,239,751 | A | * | 8/1993 | Kanamaru et al. | 29/888.44 |

OTHER PUBLICATIONS

Metals Handbook, 8th Edition, vol. 1, Properties and Selection of Metals, American Society for Metals, Metals Park, Ohio, p. 960.*

* cited by examiner

*Primary Examiner*—David B Jones
(74) *Attorney, Agent, or Firm*—Harness, Dickey & Pierce, P.L.C.

(57) ABSTRACT

A method for cold-forming a nozzle for a laser includes placing a slug or tube of oxygen-free copper into a die. A mandrel is forced into the copper slug or tube. The resultant compressive force causes the copper to cold flow around the mandrel and the die to define an inner shape and an outer dimension of the part.

19 Claims, 3 Drawing Sheets

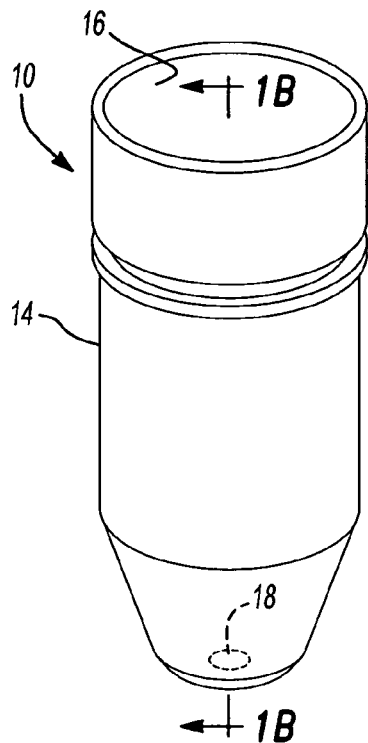
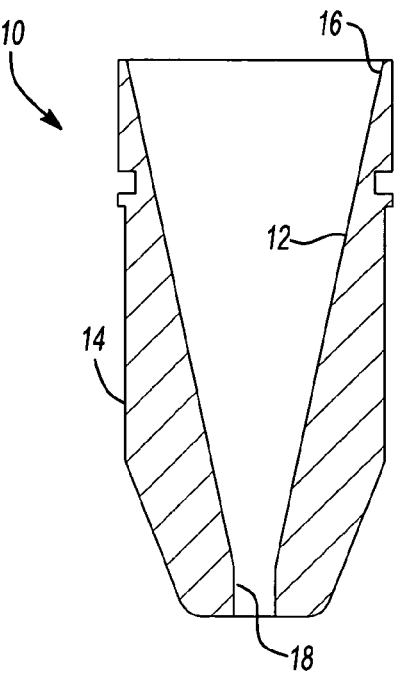
Fig-1A  Fig-1B
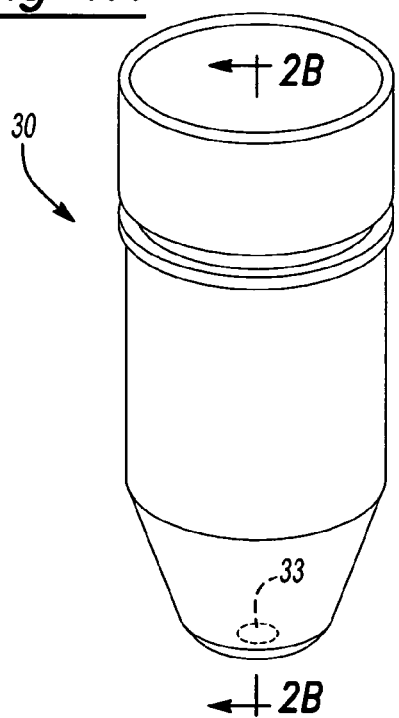
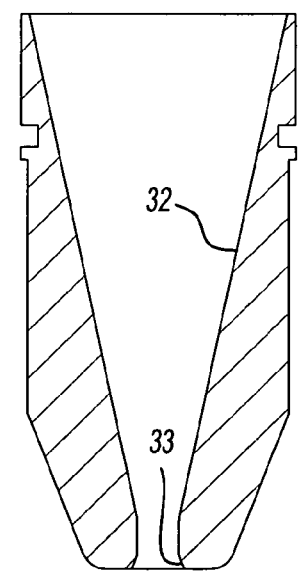
Fig-2A  Fig-2B

COLD FORM NOZZLE FOR LASER PROCESSING

CROSS-REFERENCE TO RELATED APPLICATIONS

This application claims the benefit of U.S. Provisional Application No. 60/526,119, filed Dec. 1, 2003.

FIELD OF INVENTION

The present invention relates to lasers and more particularly a method for making a laser nozzle.

BACKGROUND OF INVENTION

Laser cutting has become an increasingly popular method of working a piece of material especially when precise tolerances are necessary. Currently, many laser processing heads incorporate features and devices that help ensure optimal and consistent processing results. A laser processing head typically includes a focusing optic to concentrate the laser beam and a nozzle, usually made of copper, having a conical inner surface tapering toward an outlet aperture for directing a stream of gas such as nitrogen, oxygen, or air coaxial with the focused laser beam.

The inner surface of the nozzle serves as the boundary between the flowing gas at high pressures and the outside world. The roughness of the surface directly influences the turbulence of the flow. Additionally, any discontinuities from machining processes produce friction and turbulence. The laser usually consists of a YAG or CO2 lasing medium, at wavelengths between 1 and 11 microns. Normally the laser is aligned so as to travel through the nozzle without striking it. However, a misaligned laser beam will reflect or glance off of the inner surface of the nozzle. If the reflective properties of the surface are not sufficient the beam will be absorbed resulting in heat that can destroy or deform the contours of the nozzle. In addition, laser reflections off a work-piece during a laser operation may reflect back at the nozzle. This may cause damage to the nozzle if the inner and outer surfaces of the nozzle do not have adequate reflective properties.

The current state-of-the-art uses nozzles that are machined on various high-speed lathes utilizing free machining copper alloys such as tellurium copper. The resulting nozzles while of high quality have a surface roughness inside or 15-20 micro inches RMS and can have burrs and chips left over from the material removal required. A new method of shaping the interior for cold forming a nozzle for a laser includes placing a slug of oxygen-free copper into a die. A mandrel is forced into this slug with a high compressive force causing the copper to cold flow around the mandrel. The inner surface of the slug is an exact replica in reverse of the mandrel and the outside of the slug assumes the shape of the outer retention die.

Further areas of the applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

SUMMARY

A method of cold-forming a nozzle for a laser includes placing a slug of oxygen-free copper into a die. A shaped mandrel is forced into the slug causing the slug to be extruded around the mandrel. Compressive force is applied from the die onto the slug to define an outer dimension of the nozzle. Radial compressive force is applied onto an inner surface of the slug to define an inner dimension of the nozzle.

According to other features, forcing the shaped mandrel includes forcing a distal end of the shaped mandrel through the slug and defining an outlet aperture of the nozzle. Forcing the shaped mandrel further includes forcing a proximal end of the shaped mandrel into the slug and defining an inlet aperture of the nozzle. Applying the radial compressive force includes forcing the shaped mandrel through the slug whereby the shaped mandrel defines an engagement surface that tapers toward the distal end of the shaped mandrel.

According to yet other features, the engagement surface of the shaped mandrel urges the slug into an inner geometry of the die. Forcing the shaped mandrel includes locating the distal end of the shaped mandrel at a position beyond a portion of the slug identified to form the outlet aperture of the nozzle.

BRIEF DESCRIPTION OF THE DRAWINGS

The present invention will become more fully understood from the detailed description and the accompanying drawings, wherein;

FIG. 1A is a perspective view of a laser nozzle according to the present teachings;

FIG. 1B is a sectional view of the laser nozzle of FIG. 1A;

FIG. 2A is a perspective view of a laser nozzle according to additional features;

FIG. 2B is a sectional view of the laser nozzle of FIG. 2A;

DETAILED DESCRIPTION OF PREFERRED EMBODIMENTS

Figure 3:
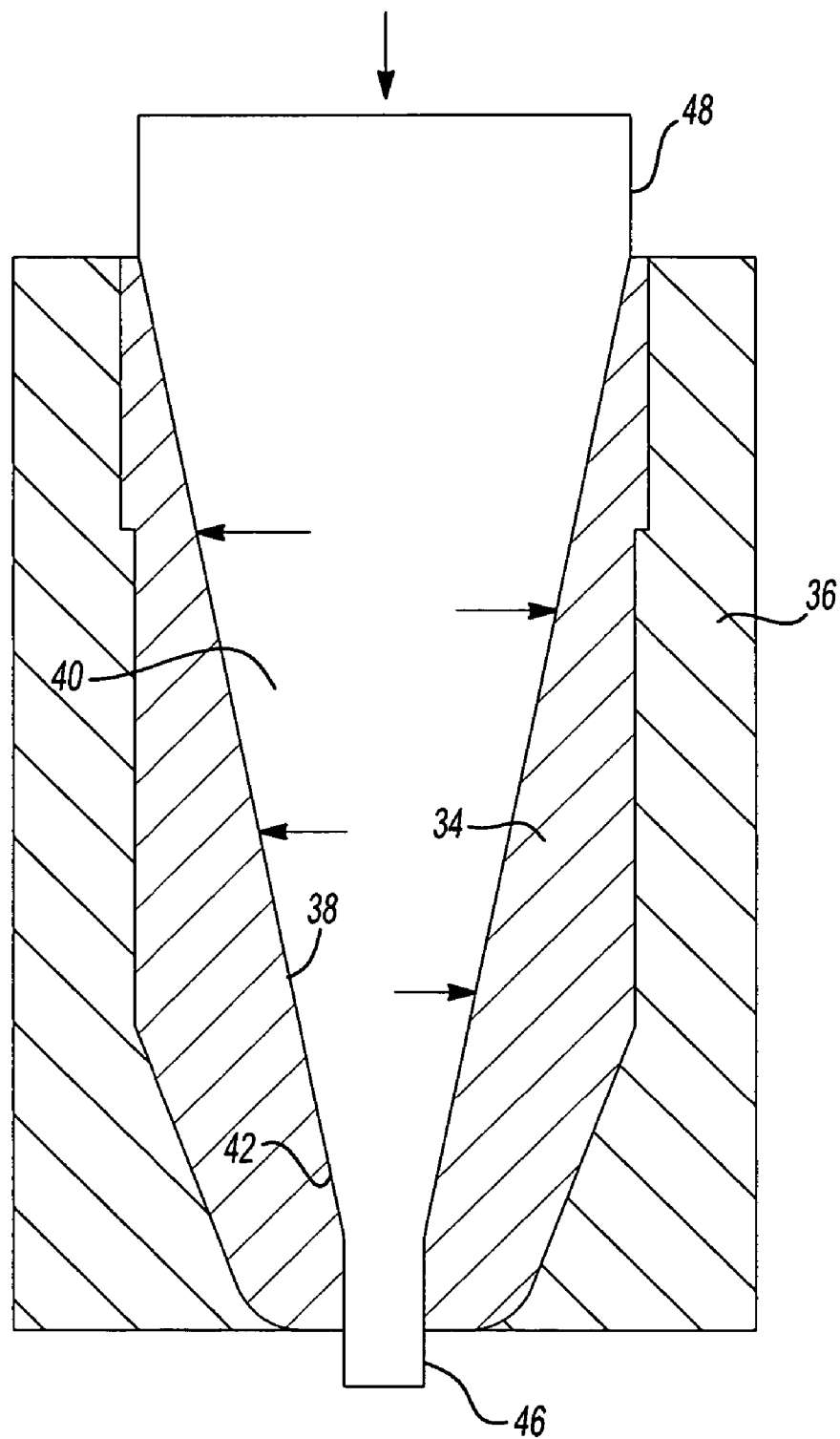
FIG. 3 is a sectional view of a copper blank during swaging.

The following description of the preferred embodiment(s) is merely exemplary in nature and is in no way intended to limit the invention, its application or uses.

With reference to the FIGS. 1A and 1B, a laser nozzle according to the present teachings is shown and generally identified at reference numeral 10. The laser nozzle 10 generally includes an inner surface 12 and an outer surface 14. An inlet aperture 16 is arranged on a proximal end and an outlet aperture 18 is arranged on a distal end. As shown in FIGS. 2A and 2B, a laser nozzle 30 having an alternate inner surface 32 is shown. Specifically the inner surface 32 provides an alternate outlet aperture 33 on its distal end. As will be described herein, the shape of the nozzle head is merely exemplary and any laser nozzle geometry may be incorporated.

With further reference now to FIG. 3, a method of making the laser nozzle 10 will be described in greater detail. It will be appreciated that while the method will be explained with respect to the laser nozzle 10, the same method may be employed to make the laser nozzle 30 or any other laser nozzle. The laser nozzle 10 is made of pure, oxygen-free, high conductivity copper using cold-forming. More specifically, the laser nozzle 10 is made by swaging a mandrel into a piece of high conductivity copper. First, a slug, tube or rod of copper 34 is placed inside a die 36. The desired geometry of the inner surface 38 is determined by forcing a mandrel 40 inside the slug or tube 34 thus causing the slug or tube 34 to cold flow around the mandrel 40. The mandrel 40 defines a tapered engagement surface 42 having a desired surface finish. The surface finish of the engagement surface 42 of the mandrel 40 including the predetermined inside geometry of the nozzle is transferred onto the inner surface 38 of the slug or tube 34. In addition, the mandrel 40 includes structure at a proximal end 48 and a distal end 46 for controlling the formation of the inlet aperture 16 and the outlet aperture 18 of the nozzle 10. More specifically, the mandrel 40 may extend beyond an area of the slug or tube 34 identified to form the inlet aperture 16 (proximal end 48) and the outlet aperture 18 (distal end 46) of the nozzle 10.

The high pressure created by the mandrel 40 allows the unique features of the mandrel 40 to be precisely transferred to the pure oxygen-free, high conductivity copper tube 34. The profile of the mandrel 40 may be reproduced exactly in the profile of the inner surface 38. The cold-form process provides consistency of tolerances. As a result, repeatability is typically within 1-micron from part to part. In addition, ultra-smooth surface finish is achieved on critical interior surfaces of less than 0.007 microns RMS. The cold-form process allows a complete profile of the inner surface 38 including all diameters such as the outlet aperture 18 to be cold formed in a single pressing operation. Rough overall exterior shapes may also be formed by the cold-forming process. Final exterior contours and shapes may then be machined using existing precision diamond-tooling machine technology.

The use of cold-formed pure, oxygen-free, high conductivity copper creates a several percent higher reflectivity to CO2 and YAG wavelengths from conventional machined copper nozzles. Such an increase in reflectivity has been shown to be 99.8% as compared to 97.5% with conventional machining. Conventional machined nozzles typically have an internal surface finish of around 1 micrometer. The cold-formed nozzle 10 according to the present invention has an internal surface finish of around 0.1 micrometer. The increased reflectivity reduces damage from misaligned laser beams or workpiece reflections striking the nozzle 10 during a cutting operation. The exterior 14 of the pure, oxygen-free, high conductivity copper nozzle body 10 can also be polished to a shiny smooth surface to reduce adhesion of cutting residues. In addition to pure, oxygen-free copper, other materials may be used. For example, silver-bearing copper, zirconium copper and others materials are contemplated.

Figure 4:
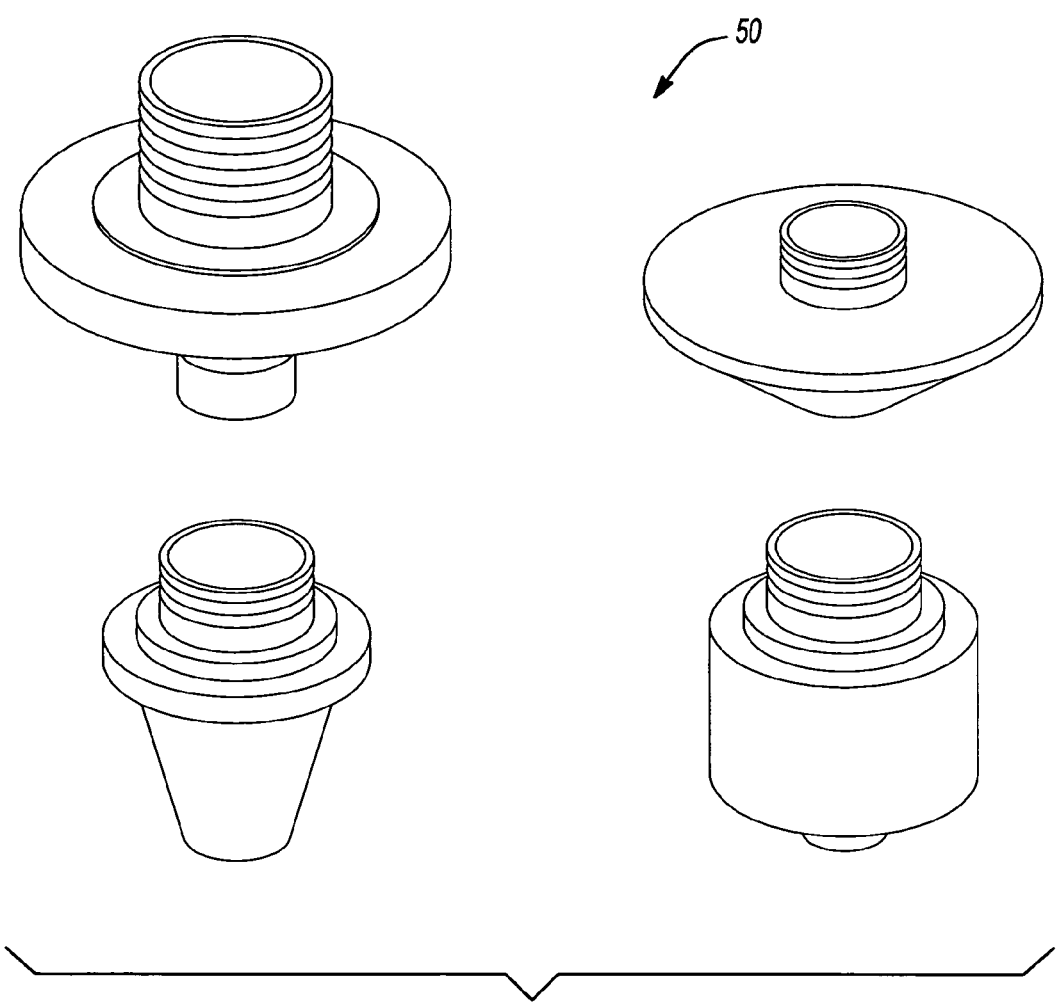
FIG. 4 is a perspective view of a collection of laser nozzles according to present teachings.

With reference now to FIG. 4 a collection of laser nozzles 50 created by cold-forming technique described herein are shown. The wide range of controllable geometries of inner surfaces and outer surfaces are illustrated. Again, the geometries of the laser nozzles 50 are merely exemplary, and any laser nozzle geometry is contemplated according to the teachings of the present invention.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method of cold-forming a nozzle for a laser comprising:
   placing a slug of oxygen-free copper into a die;
   forcing a shaped mandrel with an ultra-smooth surface into said slug causing said slug to be extruded around said mandrel; and
   forming the nozzle with a high interior surface reflectivity to $CO_2$ and YAG laser wavelengths, specifically wherein the nozzle has an interior surface reflectivity of greater than 97.5% to $Co_2$ and YAG laser wavelengths.

2. The method of claim 1 wherein forcing said shaped mandrel includes forcing a distal end of said shaped mandrel through said slug and defining an outlet aperture of the nozzle with a high reflectivity to $CO_2$ and YAG laser wavelenghts greater than 97.5% to $CO_2$ and YAG laser wavelengths.

3. The method of claim 2 wherein forcing said shaped mandrel includes locating said distal end of said mandrel at a position beyond a portion of said slug identified to form said outlet aperture of said nozzle.

4. The method of claim 2 wherein forcing said shaped mandrel includes forcing a proximal end of said shaped mandrel into said slug an defining an inlet aperture of the nozzle.

5. The method of claim 4 wherein forcing said shaped mandrel includes locating said proximal end of said mandrel at a position beyond a portion of said slug identified to form said inlet aperture of said nozzle.

6. The method of claim 4 further comprising forcing said shaped mandrel through said slug whereby said shaped mandrel defines an engagement surface that tapers toward said distal end of said shaped mandrel.

7. The method of claim 6 wherein said engagement surface urges said slug into an inner geometry of said die.

8. A method of forming a nozzle for a laser comprising:
   placing a material into a die wherein the material is selected from the group consisting of oxygen-free copper, silver-bearing copper, and zirconium copper;
   directing a shaped mandrel with an ultra-smooth surface into said material causing said material to be extruded around said mandrel;
   applying an outward radial compressive from said shaped mandrel onto said material thereby defining an inner dimension of the nozzle; and
   forming the nozzle with an internal surface finish of at or near 0.1 micrometer and wherein the nozzle yields an interior surface reflectivity of greater than 97.5% to $CO_2$ and YAG laser wavelengths.

9. The method of claim 8 wherein applying an outward radial compressive force causes an inward radial compressive force from said die onto said material thereby defining an outer dimension of the nozzle.

10. The method of claim 9 wherein directing said shaped mandrel includes directing a distal end of said shaped mandrel through said material and defining an outlet aperture of the nozzle.

11. The method of claim 10 wherein forcing said shaped mandrel includes locating said distal end of said mandrel at a position beyond a portion of said material identified to form said outlet aperture of said nozzle.

12. The method of claim 10 wherein directing said shaped mandrel includes directing a proximal end of said shaped mandrel into said material and defining an inlet aperture of the nozzle.

13. The method of claim 12 wherein forcing said shaped mandrel includes locating said proximal end of said mandrel at a position beyond a portion of said material identified to form said inlet aperture of said nozzle.

14. The method of claim 12 wherein applying said outward radial compressive force includes forcing said shaped mandrel through said material whereby said shaped mandrel defines an engagement surface that tapers toward said distal end of said shaped mandrel.

15. The method of claim 14 wherein said engagement surface urges said material into an inner geometry of said die.

16. A method of making a laser nozzle comprising:

placing a slug of oxygen-free copper into a die;

forcing a shaped mandrel into said slug causing said slug to be cold-formed around said mandrel; and forming the laser nozzle with an ultra-smooth internal surface wherein the laser nozzle has a reflectivity to $CO_2$ and YAG laser wavelengths of at or near 99.8%.

17. The method of claim 16 wherein forcing said shaped mandrel includes forcing a distal end of said shaped mandrel through said slug and defining an outlet aperture of the nozzle.

18. The method of claim 17 wherein forcing said shaped mandrel includes forcing a proximal end of said shaped mandrel into said slug and defining an inlet aperture of the nozzle.

19. The method of claim 18 wherein applying said radial compressive force includes forcing said shaped mandrel through said slug whereby said shaped mandrel defines an engagement surfaces that tapers toward said distal end of said shaped mandrel.

* * * * *